US012106051B2

(12) United States Patent
Roy et al.

(10) Patent No.: US 12,106,051 B2
(45) Date of Patent: Oct. 1, 2024

(54) UNSUPERVISED APPROACH TO ASSIGNMENT OF PRE-DEFINED LABELS TO TEXT DOCUMENTS

(71) Applicant: Optum Technology, Inc., Eden Prairie, MN (US)

(72) Inventors: Suman Roy, Bangalore (IN); Shashi Kumar, Bangalore (IN); Amit Kumar, Bangalore (IN); Vijay Varma Malladi, Hyderabad (IN); Rahul Chetlangia, Noida (IN); Prakhar Pratap, Noida (IN)

(73) Assignee: Optum Technology, Inc., Eden Prairie, MN (US)

( * ) Notice: Subject to any disclaimer, the term of this patent is extended or adjusted under 35 U.S.C. 154(b) by 426 days.

(21) Appl. No.: 16/930,862

(22) Filed: Jul. 16, 2020

(65) Prior Publication Data
US 2022/0019741 A1  Jan. 20, 2022

(51) Int. Cl.
*G06F 17/00* (2019.01)
*G06F 16/00* (2019.01)
(Continued)

(52) U.S. Cl.
CPC ............ *G06F 40/30* (2020.01); *G06F 16/00* (2019.01); *G06F 16/285* (2019.01); *G06N 5/04* (2013.01); *G06N 20/00* (2019.01)

(58) Field of Classification Search
CPC .......... G06N 5/04; G06N 20/00; G06F 16/00; G06F 16/10; G06F 16/22; G06F 16/285;
(Continued)

(56) References Cited

U.S. PATENT DOCUMENTS

| 6,301,577 B1 | 10/2001 | Matsumoto et al. |
| 7,203,679 B2 | 4/2007 | Agrawal et al. |

(Continued)

FOREIGN PATENT DOCUMENTS

| CN | 109635109 A | * | 4/2019 | |
| CN | 108733837 B | * | 4/2021 | ........... G06F 40/289 |

(Continued)

OTHER PUBLICATIONS

Atutxa, Aitziber et al. "Interpretable Deep Learning To Map Diagnostic Texts To ICD-10 Codes," International Journal of Medical Informatics, vol. 129, Sep. 2019, pp. 49-59.

(Continued)

*Primary Examiner* — Michael Ortiz-Sanchez
(74) *Attorney, Agent, or Firm* — Alston & Bird LLP

(57) ABSTRACT

There is a need for more effective and efficient text categorization. This need can be addressed by, for example, techniques for semantic text categorization. In one example, a method includes determining an input vector-based representation of an input document; processing the input vector-based representation using a trained supervised machine learning model to generate the categorization based at least in part on the input vector-based representation, wherein: (i) the trained supervised machine learning model has been trained using automatically-generated training data, and (ii) the automatically generated training data is generated by determining an inferred semantic label for each unlabeled training document of one or more unlabeled training documents; and performing one or more categorization-based actions based at least in part on the categorization, and (iii) the labels are described by one or more short documents/short texts.

20 Claims, 12 Drawing Sheets

(51) Int. Cl.
  *G06F 16/28* (2019.01)
  *G06F 40/30* (2020.01)
  *G06N 5/04* (2023.01)
  *G06N 20/00* (2019.01)

(58) Field of Classification Search
  CPC ...... G06F 16/284; G06F 40/10; G06F 40/279; G06F 40/30; G06F 16/3344; G06F 16/367; G06F 16/35; G06F 16/353; G06F 16/355; G06F 16/906; G06F 16/93; G06F 16/20; G06F 16/28; G06F 16/288; G06F 18/214; G06F 40/216; G06F 40/00; G06F 18/2411; G06F 18/2415; G16H 15/00; G16H 50/20; G16H 50/07; G16H 50/70
  See application file for complete search history.

(56) References Cited

U.S. PATENT DOCUMENTS

| | | | |
|---|---|---|---|
| 7,610,192 | B1 | 10/2009 | Jamieson |
| 7,844,595 | B2 | 11/2010 | Canright et al. |
| 8,402,030 | B1 | 3/2013 | Pyle et al. |
| 8,719,197 | B2 | 5/2014 | Schmidtler et al. |
| 9,087,236 | B2 | 7/2015 | Dhoolia et al. |
| 9,171,057 | B2 | 10/2015 | Botros |
| 10,140,288 | B2 | 11/2018 | Pestian et al. |
| 10,152,648 | B2 | 12/2018 | Filimonova |
| 10,296,846 | B2 | 5/2019 | Csurka et al. |
| 10,667,794 | B2 | 6/2020 | Beymer et al. |
| 10,679,738 | B2 | 6/2020 | Ganesan et al. |
| 10,754,925 | B2 | 8/2020 | D'Souza et al. |
| 10,769,381 | B2 * | 9/2020 | Tacchi ............... G06F 16/9024 |
| 10,824,661 | B1 | 11/2020 | Huang et al. |
| 11,263,523 | B1 | 3/2022 | Duchon et al. |
| 11,379,665 | B1 * | 7/2022 | Edmund ............... G06N 3/08 |
| 11,481,689 | B2 | 10/2022 | Dong et al. |
| 11,734,937 | B1 | 8/2023 | Pushkin et al. |
| 2008/0162455 | A1 | 7/2008 | Daga et al. |
| 2012/0185275 | A1 | 7/2012 | Loghmani |
| 2013/0031088 | A1 | 1/2013 | Srikrishna et al. |
| 2013/0138641 | A1 | 5/2013 | Korolev et al. |
| 2013/0254153 | A1 * | 9/2013 | Marcheret ............... G06N 7/00 706/59 |
| 2015/0066974 | A1 | 3/2015 | Winn |
| 2015/0227505 | A1 | 8/2015 | Morimoto |
| 2015/0286629 | A1 * | 10/2015 | Abdel-Reheem ..... G06F 40/295 704/9 |
| 2016/0117589 | A1 * | 4/2016 | Scholtes ............... G06N 5/02 706/12 |
| 2016/0300020 | A1 | 10/2016 | Wetta et al. |
| 2017/0286869 | A1 | 10/2017 | Zarosim et al. |
| 2017/0337334 | A1 | 11/2017 | Stanczak et al. |
| 2018/0165554 | A1 | 6/2018 | Zhang et al. |
| 2018/0349388 | A1 * | 12/2018 | Skiles ............... G06N 20/10 |
| 2019/0065986 | A1 | 2/2019 | Witbrock et al. |
| 2019/0108175 | A1 | 4/2019 | Sevenster et al. |
| 2020/0111019 | A1 * | 4/2020 | Goodsitt ............... G06N 3/082 |
| 2020/0125639 | A1 | 4/2020 | Doyle |
| 2020/0134506 | A1 | 4/2020 | Wang et al. |
| 2020/0202181 | A1 * | 6/2020 | Yadav ............... G06F 16/313 |
| 2020/0312431 | A1 | 10/2020 | Zhang et al. |
| 2020/0327404 | A1 | 10/2020 | Miotto et al. |
| 2020/0334416 | A1 | 10/2020 | Vianu et al. |
| 2020/0356627 | A1 | 11/2020 | Pablo et al. |
| 2020/0364404 | A1 | 11/2020 | Priestas et al. |
| 2020/0387668 | A1 | 12/2020 | Yokote et al. |
| 2020/0410157 | A1 | 12/2020 | Van et al. |
| 2021/0034813 | A1 | 2/2021 | Wu et al. |
| 2021/0065683 | A1 | 3/2021 | Meng et al. |
| 2021/0149937 | A1 | 5/2021 | Coulombe et al. |
| 2021/0157979 | A1 | 5/2021 | Sheide et al. |
| 2021/0182479 | A1 | 6/2021 | Kim et al. |
| 2021/0335469 | A1 | 10/2021 | Xie et al. |
| 2021/0343410 | A1 | 11/2021 | Zhang et al. |
| 2021/0358601 | A1 | 11/2021 | Pillai et al. |
| 2021/0365676 | A1 | 11/2021 | Valouch |
| 2022/0019741 | A1 | 1/2022 | Roy et al. |
| 2022/0121823 | A1 | 4/2022 | Lockett et al. |
| 2022/0139384 | A1 | 5/2022 | Wu et al. |
| 2022/0207536 | A1 | 6/2022 | Tian et al. |
| 2022/0318504 | A1 | 10/2022 | Malkiel et al. |
| 2022/0368696 | A1 | 11/2022 | Karpovsky et al. |
| 2022/0414330 | A1 | 12/2022 | Roy et al. |
| 2023/0034401 | A1 | 2/2023 | Weston et al. |
| 2023/0103382 | A1 | 4/2023 | Lu et al. |
| 2023/0108863 | A1 | 4/2023 | Gunasekara et al. |
| 2023/0119402 | A1 | 4/2023 | Kumar et al. |
| 2023/0333518 | A1 | 10/2023 | Oi et al. |
| 2023/0419034 | A1 | 12/2023 | Roy et al. |
| 2023/0419035 | A1 | 12/2023 | Roy et al. |

FOREIGN PATENT DOCUMENTS

| | | |
|---|---|---|
| EP | 3392780 A2 | 10/2018 |
| WO | 2021/252419 A1 | 12/2021 |
| WO | 2022/081812 A1 | 4/2022 |

OTHER PUBLICATIONS

Bai, Tian et al. "Improving Medical Code Prediction From Clinical Text Incorporating Online Knowledge Sources," In Proceedings of the 2019 World Wide Web Conference, pp. 72-82, May 13-17, 2019, San Francisco, CA, USA, DOI: 10.1145/3308558.3313485.

Baumel, Ted et al. "Multi-Label Classification Of Patient Notes: Case Study On ICD Code Assignment," In Workshops at the Thirty-Second AAAI Conference On Artificial Intelligence, Jun. 20, 2018, pp. 409-416.

Goldstein, Ira et al. "Three Approaches to Automatic Assignment of ICD-9-CM Codes To Radiology Reports," AMIA Annual Symposium Proceedings Archive, Oct. 11, 2007, pp. 279-283, PMID: 18693842, PMCID: PMC2655861.

Kavuluru, Ramakanth et al. "Unsupervised Extraction of Diagnosis Codes from EMRs Using Knowledge-Based and Extractive Text Summarization Techniques," Advancement of Artificial Intelligence, vol. 2013, May 2013, pp. 77-88, DOI: 10.1007/978-3-642-38457-8_7, PMCID: PMC552414, NIHMSID: NIHMS877790, PMID: 28748227.

Mullenbach, James et al. "Explainable Prediction of Medical Codes From Clinical Text," arXiv:1802.056952v2 [cs.CL] Apr. 16, 2018, (11 pages).

Patel, Kevin et al. "Adapting Pre-Trained Word Embeddings For Use In Medical Coding," In Biomedical Natural Language Processing Workshop (BioNLP 2017), Aug. 2017, (5 pages).

Scheurwegs, Elyne et al. "Assigning Clinical Codes With Data Driven Concept Representation On Dutch Clinical Free Text," Journal of Biomedical Informatics, vol. 69, Apr. 8, 2017, pp. 118-127, DOI: 10.1016/j.jbi.2017.04.007.

Sonabend, W. Aaron et al. "Automated ICD Coding Via Unsupervised Knowledge Integration (UNITE)," International Journal of Medical Informatics, vol. 139, Jul. 2020, pp. 104135, ISSN: 1386-5056.

Werner, Matheus et al. "Speeding Up Word Mover's Distance and Its Variants Via Properties Of Distances Between Embeddings," arXiv: 1912.005092v2 [cs.CL] May 8, 2020, (8 pages).

Xie, Pengtao et al. "A Neural Architecture for Automated ICD Coding," Proceedings of the 56th Annual Meeting of the Association for Computational Linguistics (Long Papers), pp. 1066-1076, Jul. 15-20, 2018, Melbourne Australia.

Xu, Keyang et al. "Multimodal Machine Learning for Automated ICD Coding," Proceedings of Machine Learning Research, vol. 106, (18 pages), Oct. 28, 2019, PMLR.

Zhang, Minghua et al. "An Unsupervised Model With Attention Autoencoders For Question Retrieval," The Thirty-Second AAAI Conference On Artificial Intelligence (AAAI-18), vol. 32, No. 1, Apr. 26, 2018, pp. 4978-4986.

Arumae, Kristjan et al., "CALM: Continuous Adaptive Learning for Language Modeling," arXiv:2004.03794v1 [cs.CL], Apr. 8, 2020, available online at https://arxiv.org/pdf/2004.03794.pdf.

(56) References Cited

OTHER PUBLICATIONS

Chen, Pei-Fu et al. Automatic ICD-10 Coding and Training System: Deep Neural Network Based On Supervised Learning, JMIR Medical Informatics, Aug. 31, 2021, vol. 9, No. 8:e23230, pp. 1-13.

Delvin, Jacob et al. "BERT: Pre-training of Deep Bidirectional Transformers for Language Understanding," NAACL-HLT (1), May 24, 2019, pp. 4171-4186, arXiv: 1810.04805 [cs.CL], available online at https://arxiv.org/abs/1810.04805 (Year: 2019).

Kavuluru, Ramakanth et al. "Unsupervised Extraction of Diagnosis Codes from EMRs Using Knowledge-Based and Extractive Text Summarization Techniques," Advanced Artificial Intelligence, vol. 7884, May 2013, pp. 77-88, DOI: 10.1007/978-3-642-38457-8_7, PMCID: PMC5524149, PMID: 28748227.

Kusner, Matt J. et al. "From Word Embeddings to Document Distances," Proceedings of the 32nd International Conference On Machine Learning, vol. 37, (ICML'15), Jun. 1, 2015, pp. 957-966.

Mullenbach, James et al. "Explainable Prediction of Medical Codes from Clinical Text," arXiv preprint arXiv:1802.05695v2, Apr. 16, 2018, (11 pages).

Nigam, Priyanka. Applying Deep Learning To ICD-9 Multi-Label Classification From Medical Records. Technical Report, Stanford University, (Year: 2016), pp. 1-8, available online: http://cs224d.stanford.edu/reports/priyanka.pdf.

Xie, Pengtao et al. "A Neural Architecture for Automated ICD Coding," Proceedings of the 56th Annual Meeting of the Association For Computational Linguistics (Long Papers), vol. 1, Jul. 15-20, 2018, pp. 1066-1076.

Xu, Keyang et al. "Multimodal Machine Learning for Automated ICD Coding," Proceedings of Machine Learning Research, vol. 106, Oct. 28, 2019, pp. 1-18.

Zhang, Minghua et al. "Learning Universal Sentence Representations with Mean-Max Attention Autoencoder," arXiv preprint arXiv: 1809.06590v1 [cs.CL], Sep. 18, 2018, (10 pages).

Burgess, Curt et al. "Explorations In Context Space: Words, Sentences, Discourse," Discourse Processes, vol. 25, Nos. 2-3, (1998), pp. 211-257. DOI: 10.1080/01638539809545027.

Dharmadhikari, Shweta C. et al. "A Novel Multi Label Text Classification Model Using Semi Supervised Learning," International Journal of Data Mining & Knowledge Management Process (IJDKP), vol. 2, No. 4, Jul. 2021, pp. 11-20.

Huang, Gao et al. "Supervised Word Mover's Distance," In Advances In Neural Information Processing Systems, (2016), pp. 4862-4870.

Islam, Aminul et al. "Semantic Text Similarity Using Corpus-Based Word Similarity and String Similarity," ACM Transactions on Knowledge Discovery from Data (TKDD), Issue 2, No. 2, Article 10, Jul. 2008, pp. 10:1-10:25.

Kusner, Matt J. et al. "From Word Embeddings to Document Distances," In Proceedings of the 32nd International Conference On Machine Learning, Jun. 1, 2015, (10 pages).

Landauer, Thomas K. et al. "An Introduction To Latent Semantic Analysis," Discourse Processes, (1998), vol. 25, pp. 259-284.

Li, Yuhua et al. "Sentence Similarity Based on Semantic Nets and Corpus Statistics," IEEE Transactions On Knowledge and Data Engineering, vol. 18, No. 8, Jun. 26, 2006, pp. 1-35).

Liu, Bing et al. "Text Classification by Labeling Words," American Association for Artificial Intelligence, Jul. 25, 2004, vol. 4, (6 pages).

Mikolov, Tomas et al. "Distributed Representations of Words and Phrases and Their Compositionality," In Advances In Neural Information Processing Systems, (2013) pp. 1-9.

Okazaki, Naoaki et al. "Sentence Extraction By Spreading Activation Through Sentence Similarity," IEICE Transactions Information and Systems, vol. E82, No. 1, Jan. 1999, pp. 1-9.

Saxena, Nihit. "Word Mover's Distance For Text Similarity," Aug. 26, 2019, (8 pages), [Article, Online]. [Retrieved from the Internet Oct. 15, 2020]<URL: https://towardsdatascience.com/word-movers-distance-for-text-similarity-7492aeca71b0>.

Cover, Thomas M. et al. "Elements of Information Theory," John Wiley & Sons, Inc., (565 pages), (Year: 1991), Print ISBN: 0-471-06259-6, Online ISBN: 0-471-20061-1.

Goldstein, Ira et al. "Three Approaches to Automatic Assignment of ICD-9-CM Codes to Radiology Reports," AMIA Annual Symposium Proceedings Archive, Oct. 11, 2007, pp. 279-283. PMID: 18693842; PMCID: PMC2655861, available online: https://www.ncbi.nlm.nih.gov/pmc/articles/PMC2655861/.

Hager, Gregory E. et al. "Multiple Kernel Tracking With SSD," In Proceedings of the 2004 IEEE Computer Society Conference On Computer Vision and Pattern Recognition, vol. 1, pp. I-790-I-797, Jun. 27, 2004, (Year: 2004), CVPR 2004, IEEE.

Kailath, Thomas. "The Divergence and Bhattacharyya Distance Measures in Signal Selection," IEEE Transactions On Communication Technology, vol. COM-15, No. 1, Feb. 1967, pp. 52-60.

Kumar, Amit et al. "A Fast Unsupervised Assignment Of ICD Codes With Clinical Notes Through Explanations," SAC '22: Proceedings of the 37th ACM/SIGAPP Symposium on Applied Computing, Apr. 2022, pp. 610-618, available online at. https://doi.org/10.1145/3477314.3506983.

Niblack, W. et al. "QBIC Project: Querying Images By Content, Using Color, Texture, and Shape," In Storage and Retrieval For Image and Video Databases, SPIE vol. 1908, pp. 173-187, Apr. 14, 1993.

Puzicha, Jan et al. "Non-Parametric Similarity Measures For Unsupervised Texture Segmentation and Image Retrieval," In Proceedings / CVPR, IEEE Computer Society Conference On Computer Vision and Pattern Recognition, Jul. 1997, pp. 267-272, Doi: 10.1109/CVPR.1997.609331.

Rubner, Yossi. "Perceptual Metrics For Image Database Navigation," PhD Dissertation, Stanford University, May 1999, (177 pages).

Shuai, Zhao et al. "Comparison Of Different Feature Extraction Methods For Applicable Automated ICD Coding," BMC Medical Informatics and Decision Making, vol. 22, No. 11, pp. 1-15, Dec. 2022, DOI: 10.1186/s12911-022-01753-5.

Singaravelan, Anandakumar et al. "Predicting ICD-9 Codes Using Self-Report Of Patients," Applied Sciences, vol. 11, No. 21:10046, pp. 1-18, Oct. 17, 2021, DOI: 10.3390/app112110046.

Swain, Michael J. et al. "Color Indexing," International Journal of Computer Vision, vol. 7, No. 1, (Year: 1991), pp. 11-32.

Tang, Xiangru et al. "CONFIT: Toward Faithful Dialogue Summarization With Linguistically-Informed Contrastive Fine-Tuning," arXiv: 2112.08713v1 [cs.CL] Dec. 16, 2021, (11 pages), available online at https://arxiv.org/pdf/2112.08713v1.pdf.

Werman, Michael et al. "A Distance Metric For Multi-Dimensional Histograms," Computer, Vision, Graphics, and Image Processing, vol. 32, pp. 328-336, (Year: 1985), available online at http://w3.cs.huji.ac.il/~peleg/papers/cvgip85-Distance.pdf.

Zhao, Qi et al. "Differential Earth Mover's Distance with Its Applications to Visual Tracking," IEEE Transactions on Pattern Analysis and Machine Intelligence, vol. 32, No. 2, Dec. 31, 2008, pp. 274-287.

Bittencourt, Marciele M. et al. "ML-MDL Text: A Multi label Text Categorization Technique With Incremental Learning", 2019 8th Brazilian Conference on Intelligent Systems (BRACIS). Oct. 15-18, 2019, pp. 580-585, DOI: 10.1109/BRACIS.2019.00107.

Jiang, Shuo et al. "Deep Learning For Technical Document Classification", IEEE Transactions On Engineering Management, vol. PP, Issue 99, Mar. 8, 2022, pp. 1-17, DOI: 10.1109/TEM.2022.3152216.

NonFinal Office Action for U.S. Appl. No. 17/808,223, dated Sep. 28, 2023, (29 pages), United States Patent and Trademark Office, US.

Wei, Guiying et al. "Study Of Text Classification Methods For Data Sets With Huge Features", 2010 2nd International Conference on Industrial and Information Systems, vol. 1, pp. 433-436, Jul. 10-11, 2010, DOI: 10.1109/INDUSIS.2010.5565817.

NonFinal Office Action for U.S. Appl. No. 17/355,731, dated Jun. 6, 2023, (9 pages), United States Patent and Trademark Office, US.

Notice of Allowance and Fees Due, for U.S. Appl. No. 17/355,731, dated Oct. 31, 2023, (7 pages), United States Patent and Trademark Office, US.

Notice of Allowance and Fees Due (PTOL-85) Mailed on Feb. 6, 2024 for U.S. Appl. No. 17/808,223, 17 page(s).

(56) References Cited

OTHER PUBLICATIONS

Notice of Allowance and Fees Due (PTOL-85) Mailed on Feb. 28, 2024 for U.S. Appl. No. 17/355,731, 2 page(s).
Non-Final Rejection Mailed on Jun. 3, 2024 for U.S. Appl. No. 17/808,199, 17 page(s).
Notice of Allowance and Fees Due (PTOL-85) Mailed on May 22, 2024 for U.S. Appl. No. 17/808,214, 14 page(s).

* cited by examiner

UNSUPERVISED APPROACH TO ASSIGNMENT OF PRE-DEFINED LABELS TO TEXT DOCUMENTS

BACKGROUND

Various embodiments of the present invention address technical challenges related to performing text categorization. Various embodiments of the present invention disclose innovative techniques for performing text categorization based at least in part on semantic data.

BRIEF SUMMARY

In general, embodiments of the present invention provide methods, apparatuses, systems, computing devices, computing entities, and/or the like for performing text categorization. Various embodiments of the present invention disclose techniques for performing text categorization that utilize at least one of automatically-generated training data that have been generated using Word Mover's Distance (WMD) measures and supervised text categorization models that receive as input fixed-length distributed word representations.

In accordance with one aspect, a method is provided. In one embodiment, the method comprises determining an input vector-based representation of the input document; processing the input vector-based representation using a trained supervised machine learning model to generate the categorization based at least in part on the input vector-based representation, wherein: (1) the trained supervised machine learning model has been trained using automatically-generated training data; and (2) the automatically generated training data is generated by determining an inferred semantic label for each unlabeled training document of one or more unlabeled training documents based at least in part on: (i) a prior semantic label for each labeled training document of the one or more labeled training documents, and (ii) a cross-document similarity measure for each document pair of a plurality of document pairs that is associated with a corresponding unlabeled training document of the one or more unlabeled training documents and a corresponding labeled training document of the one or more labeled training documents; and performing one or more categorization-based actions based at least in part on the categorization.

In accordance with another aspect, a computer program product is provided. The computer program product may comprise at least one computer-readable storage medium having computer-readable program code portions stored therein, the computer-readable program code portions comprising executable portions configured to determine an input vector-based representation of the input document; process the input vector-based representation using a trained supervised machine learning model to generate the categorization based at least in part on the input vector-based representation, wherein: (1) the trained supervised machine learning model has been trained using automatically-generated training data; and (2) the automatically generated training data is generated by determining an inferred semantic label for each unlabeled training document of one or more unlabeled training documents based at least in part on: (i) a prior semantic label for each labeled training document of the one or more labeled training documents, and (ii) a cross-document similarity measure for each document pair of a plurality of document pairs that is associated with a corresponding unlabeled training document of the one or more unlabeled training documents and a corresponding labeled training document of the one or more labeled training documents; and perform one or more categorization-based actions based at least in part on the categorization.

In accordance with yet another aspect, an apparatus comprising at least one processor and at least one memory, including computer program code, is provided. In one embodiment, the at least one memory and the computer program code may be configured to, with the processor, cause the apparatus to generate the categorization based at least in part on the input vector-based representation, wherein: (1) the trained supervised machine learning model has been trained using automatically-generated training data; and (2) the automatically generated training data is generated by determining an inferred semantic label for each unlabeled training document of one or more unlabeled training documents based at least in part on: (i) a prior semantic label for each labeled training document of the one or more labeled training documents, and (ii) a cross-document similarity measure for each document pair of a plurality of document pairs that is associated with a corresponding unlabeled training document of the one or more unlabeled training documents and a corresponding labeled training document of the one or more labeled training documents; and perform one or more categorization-based actions based at least in part on the categorization.

BRIEF DESCRIPTION OF THE DRAWINGS

Figure 1:
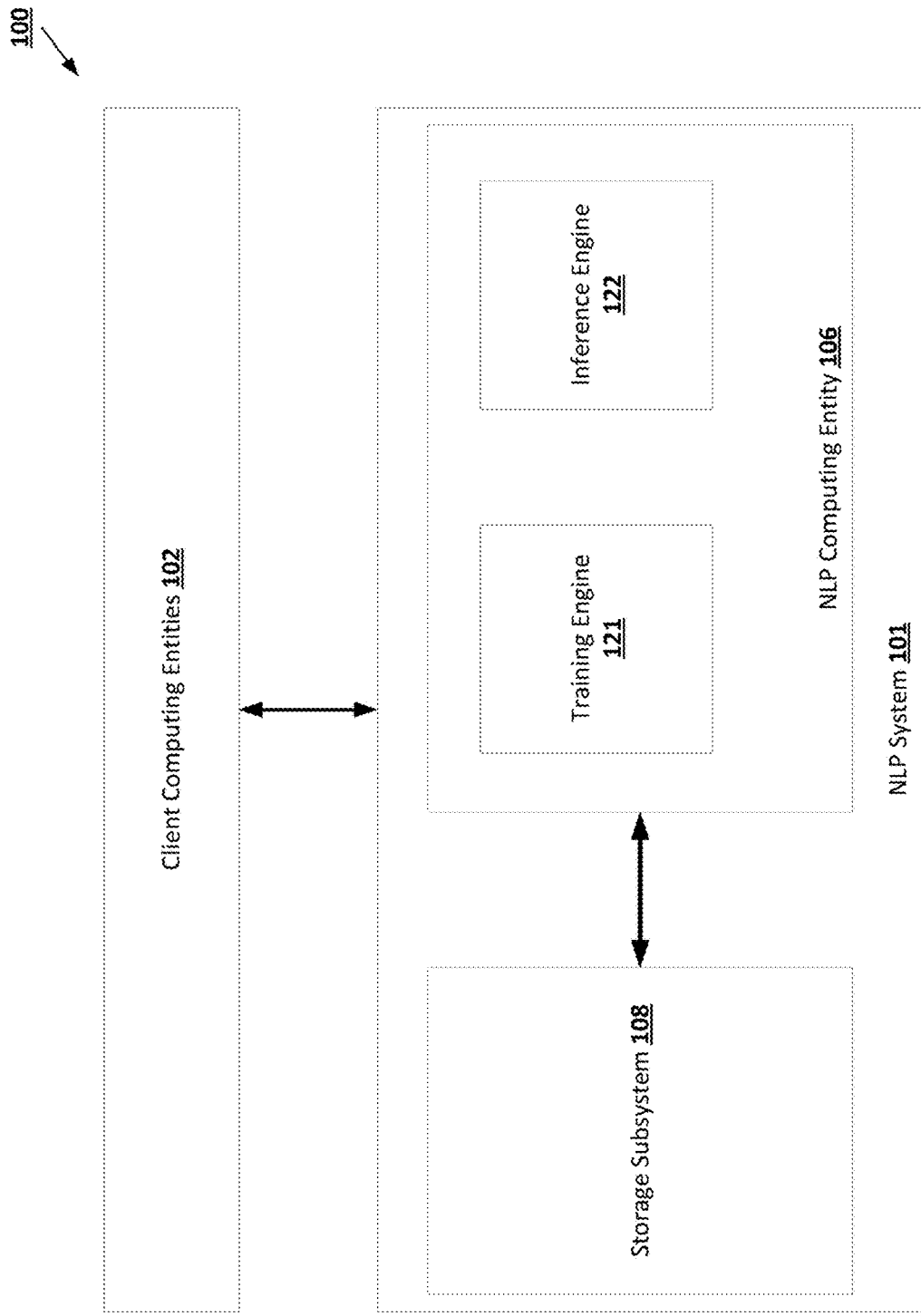

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
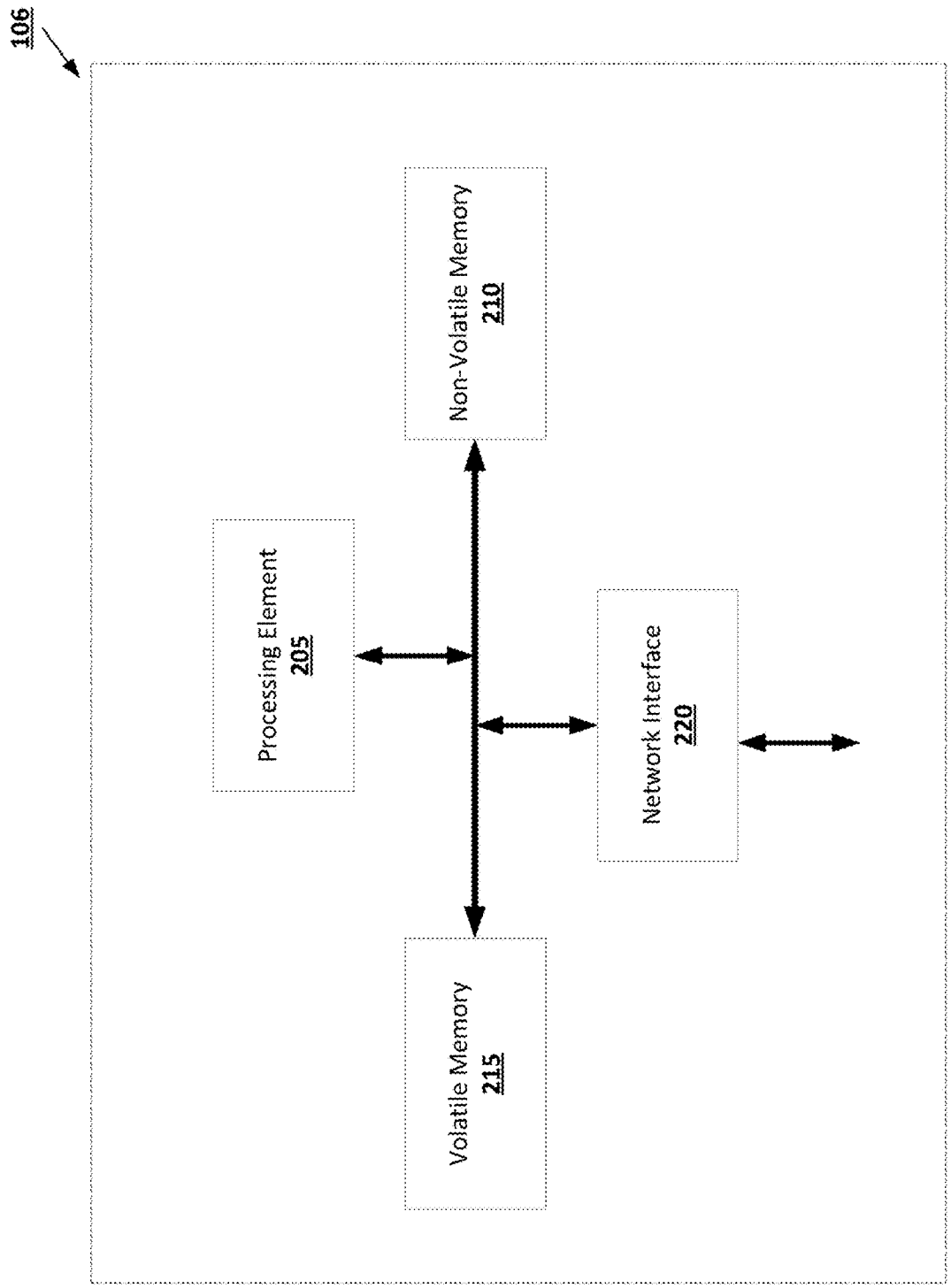

FIG. 2 provides an example NLP computing entity in accordance with some embodiments discussed herein.

Figure 3:
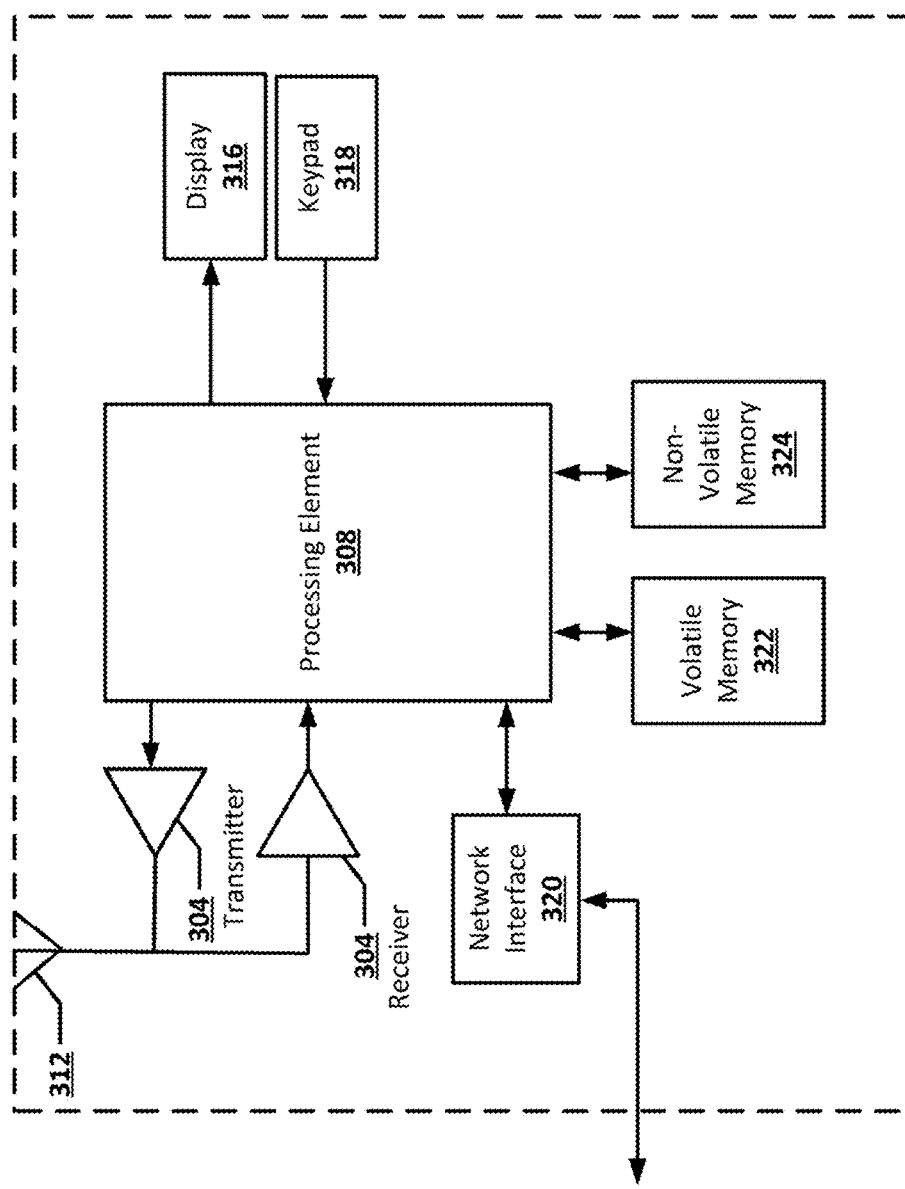

FIG. 3 provides an example client computing entity in accordance with some embodiments discussed herein.

Figure 4:
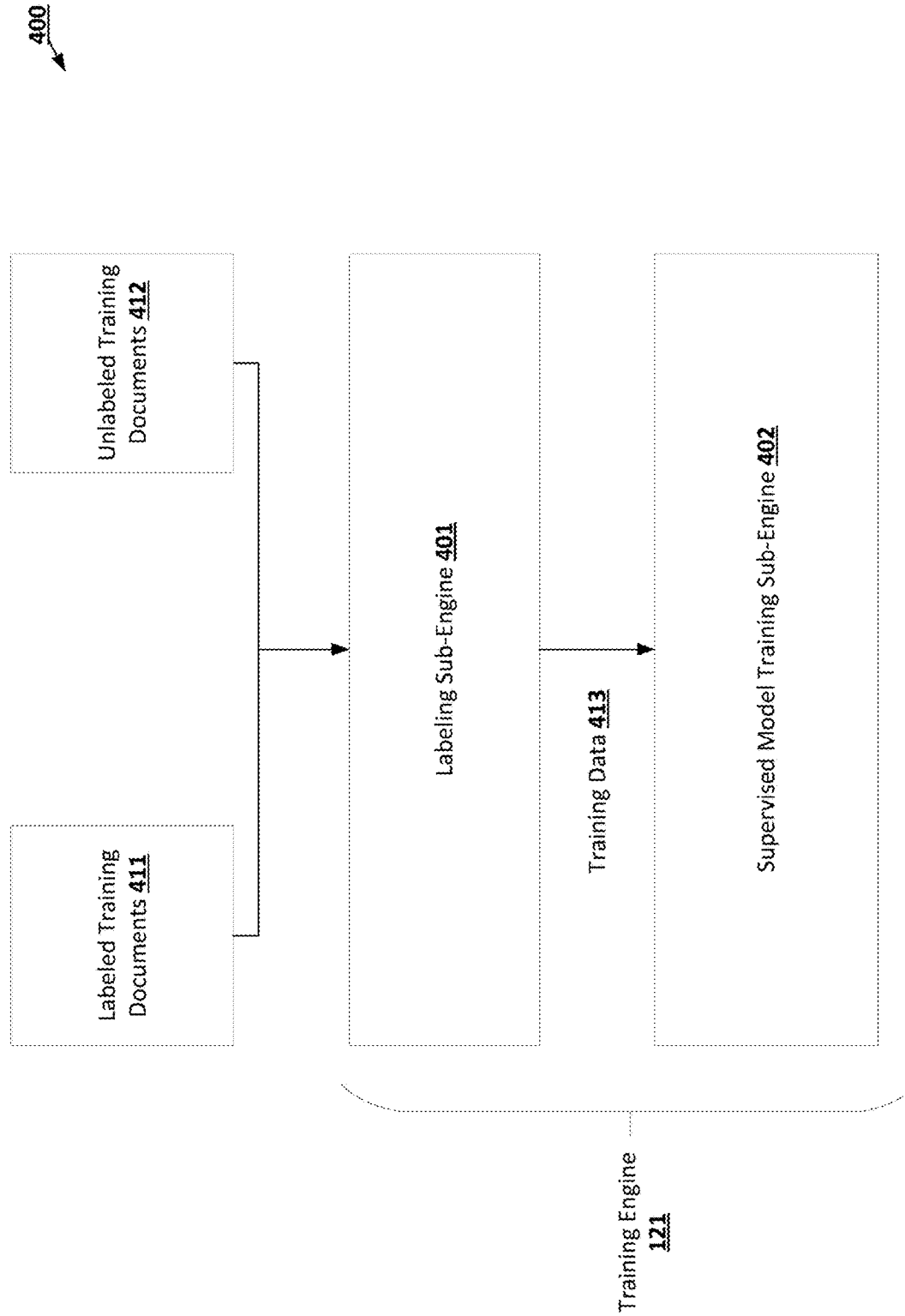

FIG. 4 is a data flow diagram of an example process for generating a trained supervised machine learning model configured to generate text categorizations for input documents in accordance with some embodiments discussed herein.

Figure 5:
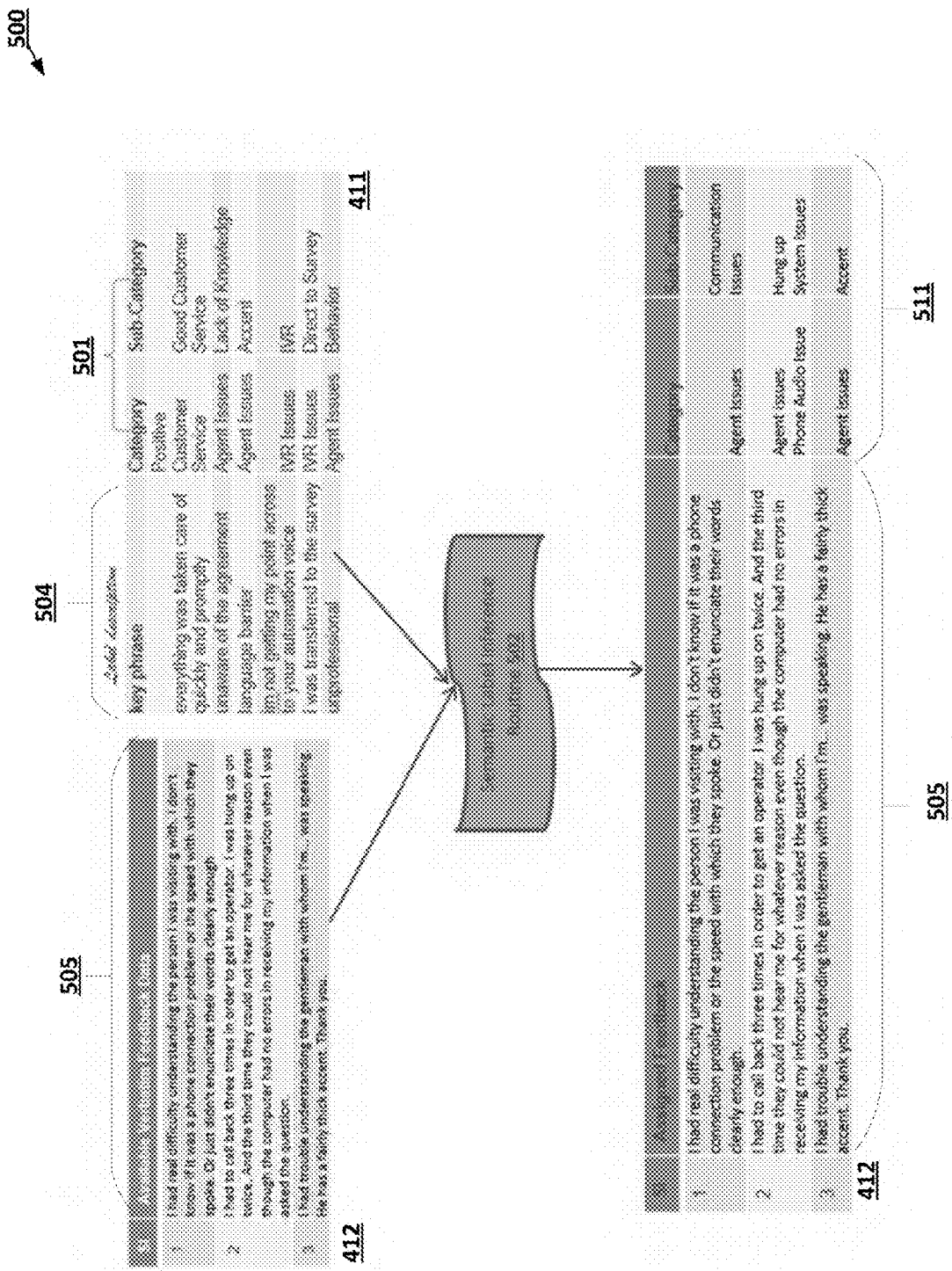

FIG. 5 provides an operational example of generating inferred semantic labels for a group of unlabeled training documents in accordance with some embodiments discussed herein.

Figure 6:
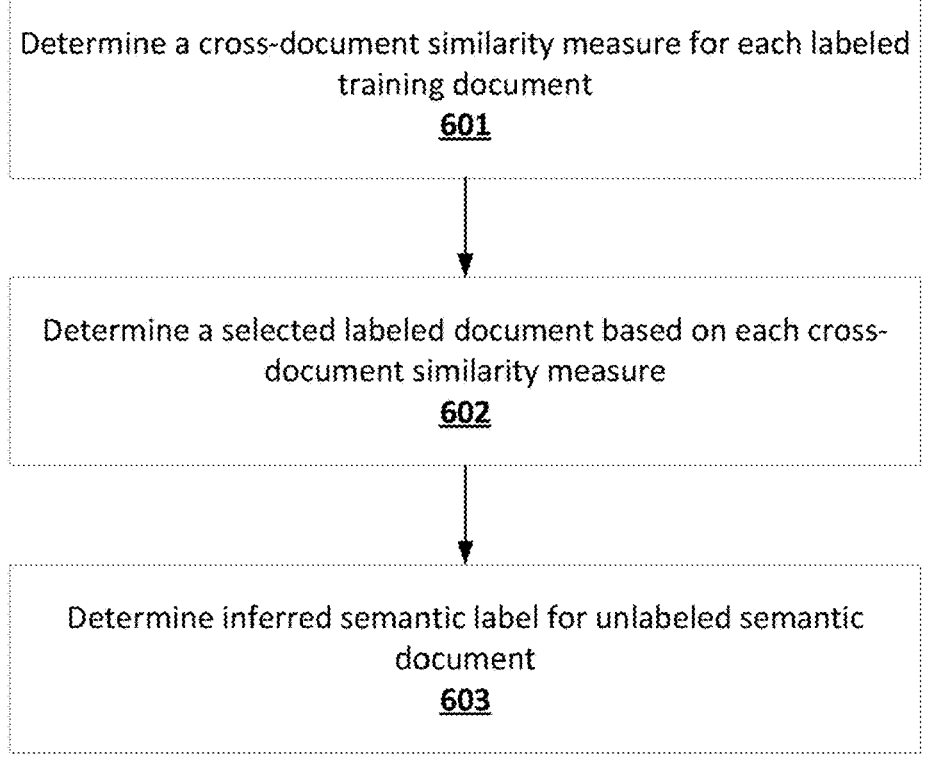

FIG. 6 is a flowchart diagram of an example process for generating an inferred semantic label for a particular unlabeled training document in accordance with some embodiments discussed herein.

Figure 7:
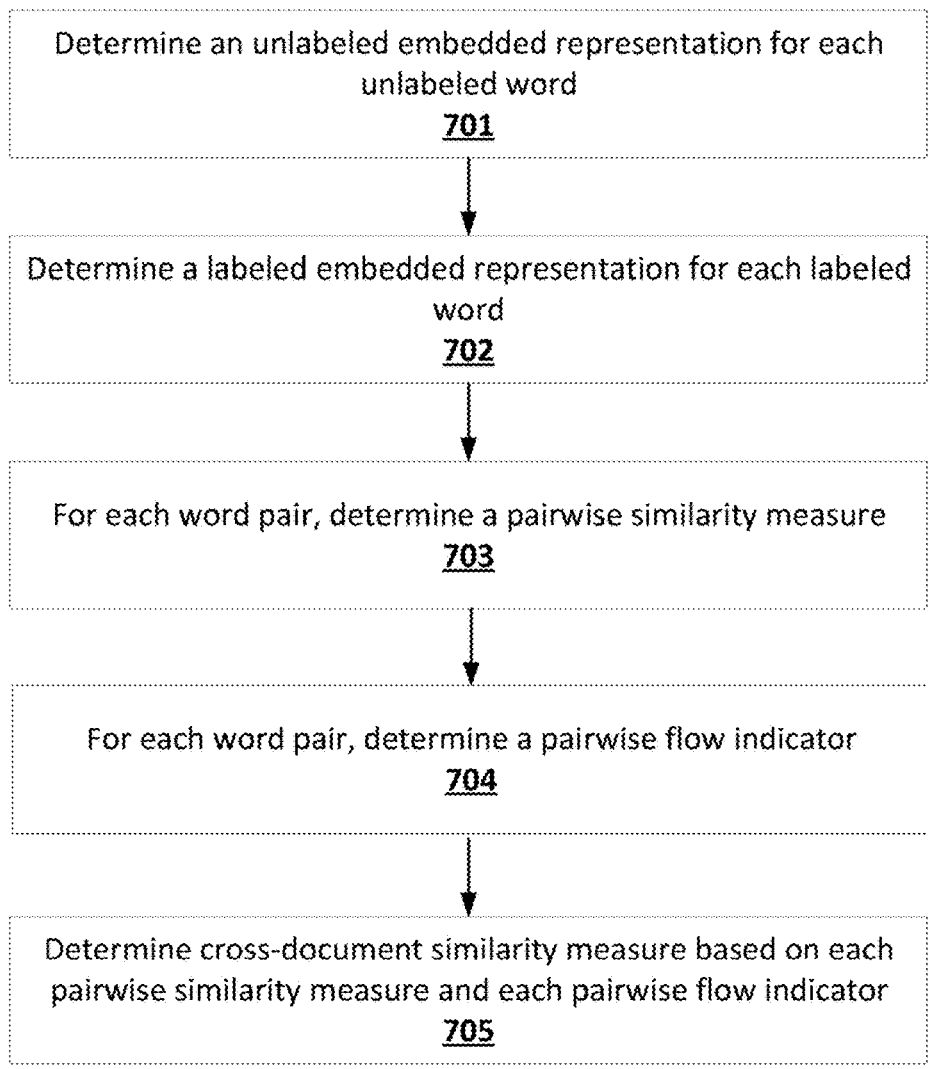

FIG. 7 is a flowchart diagram of an example process for determining a cross-document similarity measure for a labeled training document and an unlabeled training document in accordance with some embodiments discussed herein.

Figure 8:
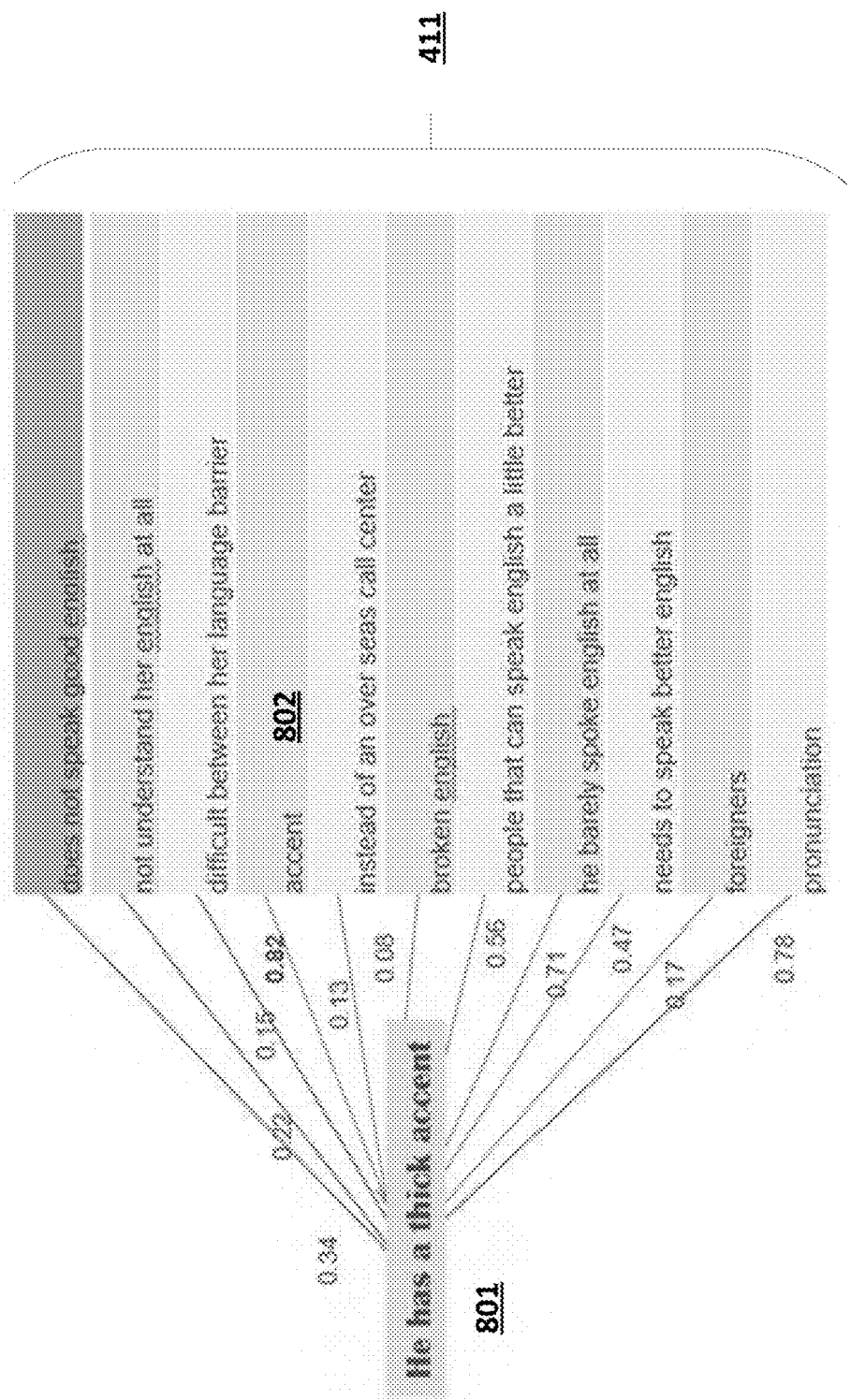

FIG. 8 provides an operational example of a cross-document word mapping data object in accordance with some embodiments discussed herein.

Figure 9:
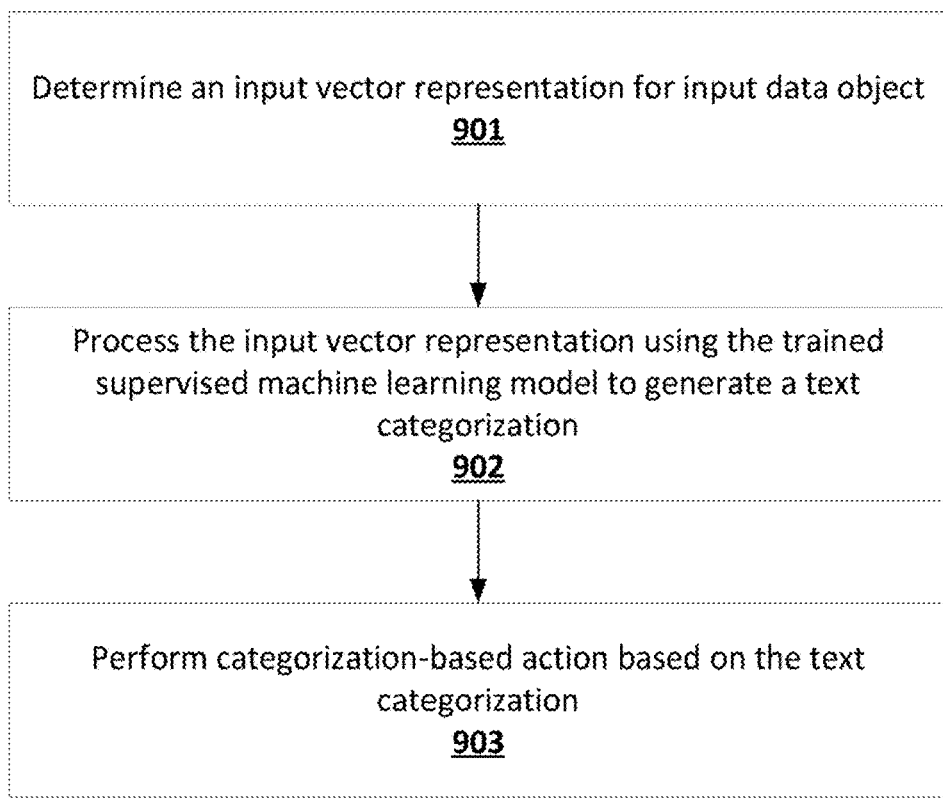

FIG. 9 is a flowchart diagram of an example process for determining a text categorization for an input document using a trained supervised machine learning model in accordance with some embodiments discussed herein.

Figure 10:
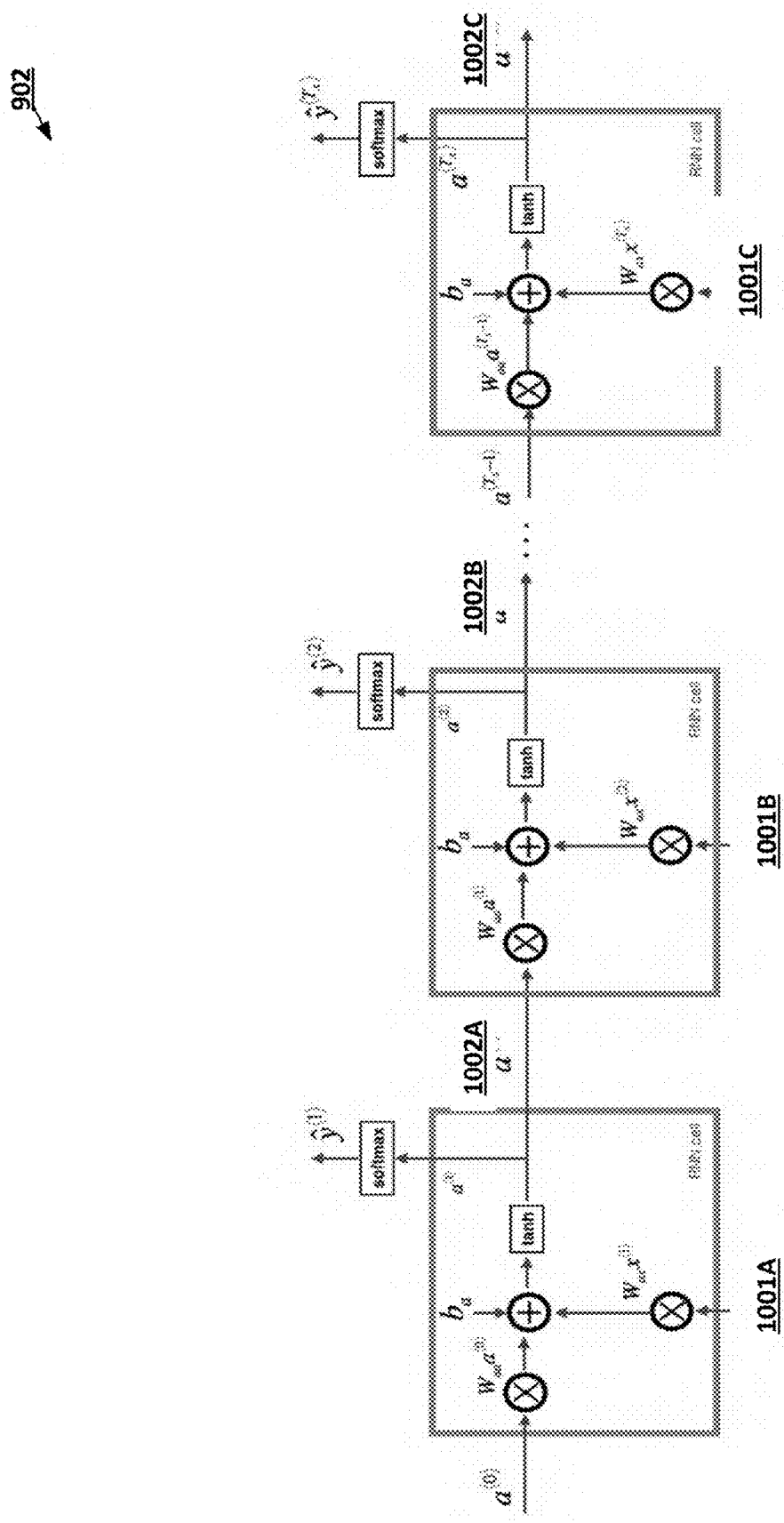

FIG. 10 provides an operational example of processing an input vector representation for an input document using a long-short term memory model in accordance with some embodiments discussed herein.

Figure 11:
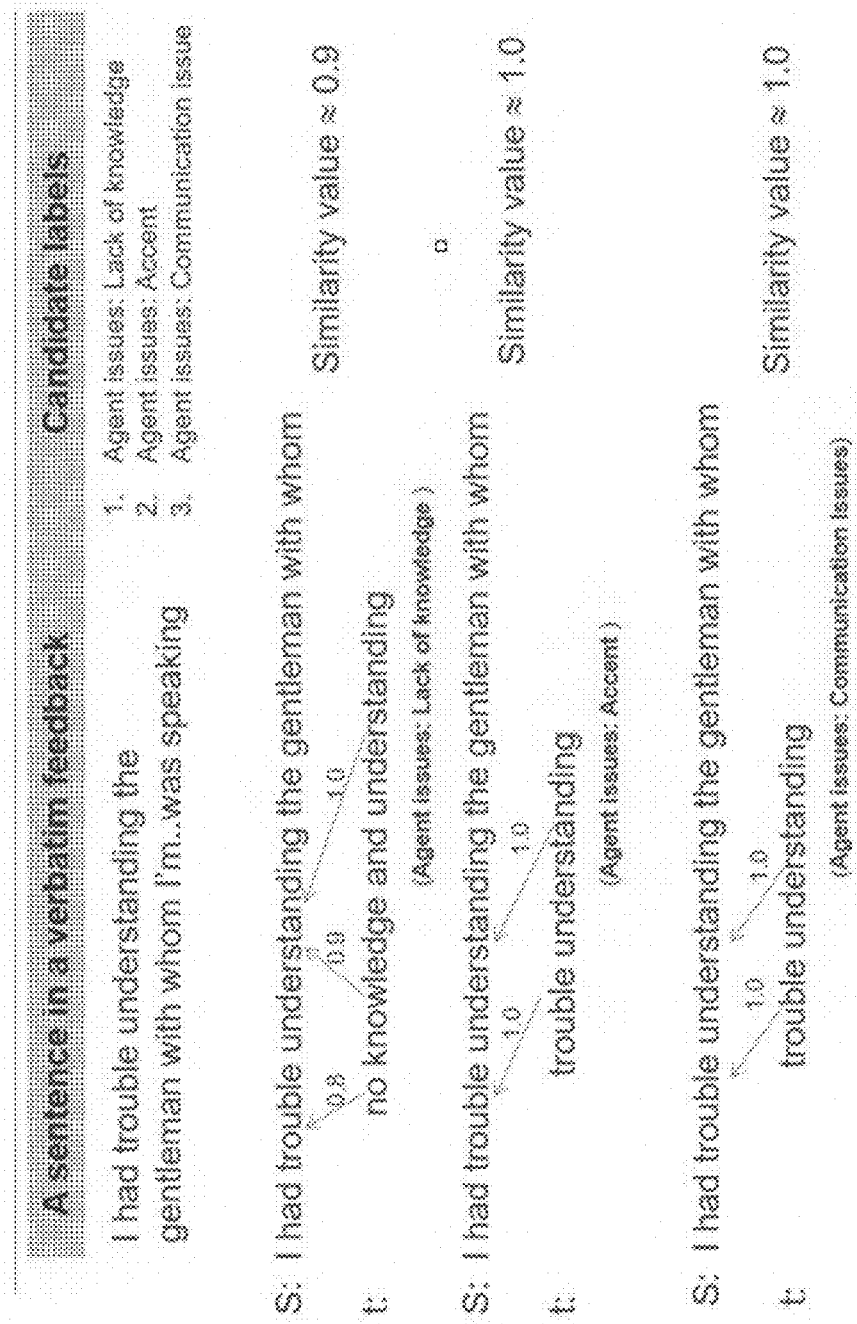

FIG. 11 provides an operational example of a text categorization recommendation user interface in accordance with some embodiments discussed herein.

Figure 12:
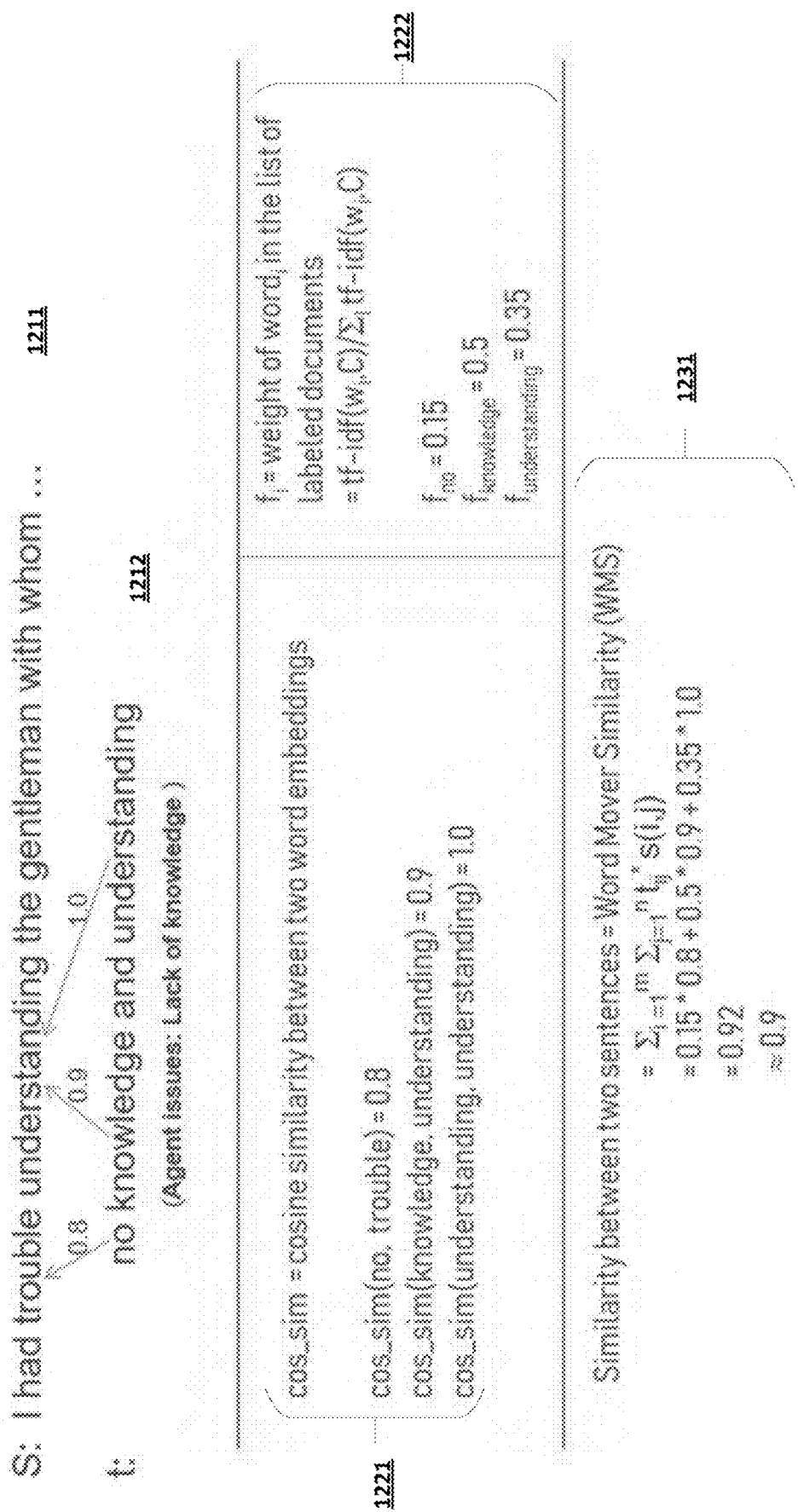

FIG. 12 provides an operational example of generating a cross-document similarity measure in accordance with some embodiments discussed herein.

DETAILED DESCRIPTION

Various embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Limited availability of training data is a major obstacle for many reliable natural language processing (NLP) frameworks. Because NLP data is unstructured, absent effective semantic feature extraction, a large amount of training data is needed to generate reliable NLP models. Effective semantic feature extraction is also often difficult and, even when possible, a computationally resource-intensive task. Therefore, many existing NLP frameworks face substantial challenges related to effectively and efficiently training NLP models that integrate semantic considerations.

Various embodiments of the present invention provide techniques for automatically generating training data based at least in part on text modeling, where the automatically-generated training data can in turn be used to generate machine learning models (e.g., trained supervised machine learning models) that are configured to generate text categorizations for input text documents. For example, in some embodiments, a NLP system may generate a trained machine learning model for performing text categorizations by determining an inferred semantic label for each unlabeled training document of one or more unlabeled training documents based at least in part on: (i) a prior semantic label for each labeled training document of the one or more labeled training documents, and (ii) a cross-document similarity measure for each document pair of a plurality of document pairs that is associated with a corresponding unlabeled training document of the one or more unlabeled training documents and a corresponding labeled training document of the one or more labeled training documents. In some of the noted embodiments, cross-document similarity measures are generated by maximizing a WMD measure (which has been used as a text modeling tool) between a corresponding pair of documents.

By providing techniques for automatically generating training data based at least in part on text modeling, various embodiments of the present invention present effective and reliable solutions that simultaneously address lack of availability of sufficient training data for generating NLP models and lack of sufficient integration of semantic models into training procedures for NLP models. Moreover, by determining cross-document similarity measures used to generate training data in accordance with a one-variable optimization (i.e., the optimization of a single WMD measure for each pair of documents), various embodiments of the present invention are able to perform semantically-informed training of NLP models in an efficient and (relative to competing solutions) resource-light manner. Accordingly, by utilizing the above-described techniques and other similar techniques described throughout this document, various embodiments of the present invention address technical challenges related to efficiently and reliably performing NLP analysis, make substantial technical improvements to efficiency and effectiveness of various existing NLP frameworks, and make important contributions to the NLP-based predictive data analysis field.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing text categorization. The architecture 100 includes a NLP system 101 configured to receive text categorization requests from the client computing entities 102, process the text categorization requests to generate text categorizations, provide the generated text categorizations to the client computing entities 102 in response to the text categorization requests, and perform categorization-based actions based at least in part on the generated text categorizations. For example, the NLP system 101 may be configured to generate incident categories and/or incident sub-categories for input documents corresponding to incident tickets. As another example, the NLP system 101 may be configured to generate diagnosis codes for input documents corresponding to medical diagnosis documents (e.g., medical provider notes).

In some embodiments, NLP system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), and/or the like, as well as any hardware, software and/or firmware required to implement it (such as, e.g., network routers, and/or the like).

The NLP system 101 may include a NLP computing entity 106 and a storage subsystem 108. The NLP computing entity 106 may be configured to generate a trained supervised machine learning model that is configured to generate text categorizations for input documents, generate text categorizations using a trained supervised machine learning model, and perform categorization-based actions based at least in part on the generated text categorizations of the input documents.

The NLP computing entity 106 may include a training engine 121 configured to generate the trained supervised machine learning model. The NLP computing entity 106 may further include an inference engine 122 configured to generate text categorizations using the trained supervised machine learning model. The inference engine 122 of the NLP computing entity 106 may be further configured to perform categorization-based actions based at least in part on the generated text categorizations of the input documents.

The storage subsystem 108 may be configured to store at least a portion of input data utilized by the NLP computing entity 106 to train a trained supervised machine learning model that is configured to generate text categorizations for input documents and/or to perform text categorization using the trained supervised machine learning model. The storage subsystem 108 may further be configured to store at least a portion of configuration data (e.g., model definition data) utilized by the NLP computing entity 106 to perform text categorization.

The storage subsystem 108 may include one or more storage units, such as multiple distributed storage units that are connected through a computer network. Each storage unit in the storage subsystem 108 may store at least one of one or more data assets and/or one or more data objects about the computed properties of one or more data assets. Moreover, each storage unit in the storage subsystem 108 may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary NLP Computing Entity

FIG. 2 provides a schematic of a NLP computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the NLP computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the NLP computing entity 106 may include or be in communication with one or more processing elements 205 (also referred to as processors, processing circuitry, and/or similar terms used herein interchangeably) that communicate with other elements within the NLP computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the NLP computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the NLP computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the NLP computing entity 106 with the assistance of the processing element 205 and operating system.

As indicated, in one embodiment, the NLP computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the NLP computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the NLP computing entity 106 may include or be in communication with one or more input elements, such as a keyboard input, a mouse input, a touch screen/display input, motion input, movement input, audio input, pointing device input, joystick input, keypad input, and/or the like. The NLP computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the NLP computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the NLP computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the NLP computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the NLP computing entity 106 and/or various other computing entities.

In another embodiment, the client computing entity 102 may include one or more components or functionality that are the same or similar to those of the NLP computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

By providing techniques for automatically generating training data based at least in part on text modeling, various embodiments of the present invention present effective and reliable solutions that simultaneously address lack of availability of sufficient training data for generating NLP models and lack of sufficient integration of semantic models into training procedures for NLP models. Moreover, by determining cross-document similarity measures used to generate training data in accordance with a one-variable optimization (i.e., the optimization of a single WMD measure for each pair of documents), various embodiments of the present invention are able to perform semantically-informed training of NLP models in an efficient and (relative to competing solutions) resource-light manner. Accordingly, by utilizing the above-described techniques and other similar techniques described throughout this document, various embodiments of the present invention address technical challenges related to efficiently and reliably performing NLP analysis, make substantial technical improvements to efficiency and effectiveness of various existing NLP frameworks, and make important contributions to the NLP-based predictive data analysis field.

In addition, most of the research in text classification assumes some fixed, simple class of feature representations (such as bag-of-words or paragraph vectors), and in the least a partially labeled corpus. In real-life applications many of these assumptions are not well-founded. Very often, the practitioners may not have access to any labeled data sets to start with. Various embodiments of the present invention address these shortcomings of various existing text classification concepts by enabling generation of labels using unsupervised learning, which can in some embodiments of the present invention be used to generate training data for a supervised learning model.

FIG. 4 is a data flow diagram of an example process 400 for generating a trained supervised machine learning model configured to generate text categorizations for input documents. Via the various steps/operations of process 400, the training engine 121 of the NLP computing entity 106 can efficiently generate reliable training data that can be used to improve accuracy of trained supervised machine learning model that are configured to generate text categorizations for input documents, such as input feedback documents and/or input incident ticket documents. As used throughout this document, a document may include any data object that includes text data, such as natural language text data.

The process 400 begins when a labeling sub-engine 401 of the training engine 121 receives labeled training documents 411 and unlabeled training documents 412. A labeled training document 411 is a data object that includes text data that has previously been assigned a prior semantic label, while an unlabeled training document 412 is a data object that includes text data that has not previously been assigned a semantic label. In some embodiments, the labeling sub-engine 401 is configured to generate inferred semantic labels for unlabeled training documents 412 based at least in part on the prior semantic labels for the labeled training documents 411. While various embodiments of the present invention discuss singular semantic labels and/or singular text categorizations for documents, a person of ordinary skill in the relevant art will recognize that a document may be associated and/or may be assigned two or more semantic labels and/or two or more text categorizations.

For example, in some embodiments, the labeled training documents 411 may include descriptive text data associated with incident tickets that have been assigned incident categories and incident subcategories, while the unlabeled training documents 412 may include descriptive text data associated with incident tickets that have not been assigned any incident category or incident subcategory. In such exemplary embodiments, the labeling sub-engine 401 may utilize the previously-assigned incident categories and incident subcategories of the labeled training documents 411 to generate incident categories and incident subcategories for the unlabeled training documents 412.

As another example, in some embodiments, the labeled training documents 411 may include descriptive text data associated with medical diagnosis documents that have been assigned diagnosis codes (e.g., International Statistical Categorization of Diseases and Related Health Problems (ICD) codes) such as descriptive data associated with particular diagnosis codes, while the unlabeled training documents 412 may include descriptive text data associated with medical diagnosis documents that have not been assigned diagnosis codes such as provider note documents. In such exemplary embodiments, the labeling sub-engine 401 may utilize the previously-assigned diagnosis codes of the labeled training documents 411 to generate diagnosis codes for the unlabeled training documents 412.

The process 400 continues when the labeling sub-engine 401 generates an inferred semantic label for each unlabeled training document 412. The inferred semantic label may be a data object that describes a semantic label for a corresponding unlabeled training document 412, where the semantic label has been generated based at least in part on a measure of similarity between the corresponding unlabeled training document 412 and the labeled training documents 411. For example, the inferred semantic label for a corresponding unlabeled training document 412 may be generated by associating the corresponding unlabeled training document 412 with a related labeled training document of the labeled training documents 411 in a manner that maximizes a WMD measure between the corresponding unlabeled training document 412 and labeled training documents 411.

An operational example of generating inferred semantic labels 511 for a group of unlabeled training documents 412 based at least in part on prior semantic labels 501 for a group of labeled training documents 411 has been depicted in FIG. 5. As depicted in FIG. 5, each labeled training document in the group of labeled training documents 411 is associated with a descriptive text 504 and two prior semantic labels 501. Moreover, each unlabeled training document in the group of unlabeled training documents 412 is associated with a descriptive text 505, but is not associated with any prior semantic text labels. As further depicted in FIG. 5, the semantic label inference routine 502 is configured to generate two inferred semantic labels 511 for each unlabeled training document in the group of unlabeled training documents 412 based at least in part on the prior semantic labels 501 for the group of labeled training documents 411.

In some embodiments, to generate inferred semantic labels for a particular unlabeled training document 412, the labeling sub-engine 401 performs the steps/operations depicted in FIG. 6. The process depicted in FIG. 6 begins at step/operation 601 when the labeling sub-engine 401 determines a cross-document similarity for each labeled training document 411 relative to the particular unlabeled training document 412. In some embodiments, the cross-document similarity measure between two documents is a data object that describes a measure of similarity of the words of a first document of the two documents relative to the words of a second document of the two documents.

In some embodiments, for a document pair including the particular unlabeled training document 412 and a particular labeled training document 411, step/operation 601 may be performed in accordance with the process depicted in FIG. 7. The process depicted in FIG. 7 begins at step/operation 701 when the labeling sub-engine 401 determines an unlabeled embedded representation for each unlabeled word of one or more unlabeled words of the particular unlabeled training document 412. An unlabeled word is a word in the unlabeled training document 412. An unlabeled embedded representation may be a data object that describes a feature-describing numeric representation of an unlabeled word in the particular unlabeled training document 412. For example, an unlabeled embedded representation for a corresponding unlabeled word may include a Word2Vec representation of the corresponding unlabeled word.

At step/operation 702, the labeling sub-engine 401 determines a labeled embedded representation for each labeled word of one or more labeled words of the particular labeled training document 411 (e.g., a keyphrase/short text). A labeled word is a word in a labeled training document 411. A labeled embedded representation may be a data object that describes a feature-describing numeric representation of a labeled word in the particular labeled training document 411. For example, a labeled embedded representation for a corresponding labeled word may include a Word2Vec representation of the corresponding labeled word.

At step/operation 703, the labeling sub-engine 401 determines, for each word pair that includes a corresponding unlabeled word of the one or more unlabeled words and a corresponding labeled word of the one or more labeled words, a pairwise similarity measure of the unlabeled embedded representation for the corresponding unlabeled word that is associated with the word pair and the labeled embedded representation for the corresponding labeled word that is associated with the word pair. The pairwise similarity measure between a pair of words may describe a measure of deviation of the embedded representations (e.g., Word2Vec representations) of the pair of words. In some embodiments, each pairwise similarity measure for a word pair of the plurality of word pairs is determined based at least in part on a cosine similarity of the corresponding unlabeled word associated with the word pair and the corresponding labeled word associated with the word pair.

The pairwise similarity measure between a pair of words may describe a feature-based measure of similarity of the pair of words. For example, the pairwise similarity measure between a pair of words may describe a measure of cosine similarity of the embedded vector representations of the two words. In some embodiments, to determine the pairwise similarity measure for a word pair that includes a corresponding unlabeled word of the one or more unlabeled words and a corresponding labeled word of the one or more labeled words, the labeling sub-engine 401 may determine a measure of cosine similarity measure of the unlabeled embedded representation for the corresponding unlabeled word that is associated with the word pair and the labeled embedded representation for the corresponding labeled word in an unlabeled document that is associated with the word pair.

At step/operation 704, the labeling sub-engine 401 determines, for each word pair of the plurality of word pairs, a pairwise flow indicator based at least in part on the pairwise similarity measure of the word pair relative to other pairwise similarity measures in a subset of the plurality of word pairs that is associated with the corresponding unlabeled word for the word pair. For example, the pairwise flow indicator for a word pair that includes a corresponding unlabeled word of the one or more unlabeled words and a corresponding labeled word of the one or more labeled words may describe a binary value that indicates whether the corresponding labeled word is the most related word for the corresponding unlabeled word according to the pairwise similarity measures associated with the corresponding unlabeled word.

In some embodiments, each pairwise flow indicator for a word pair of the plurality of word pairs is determined based at least in part on maximizing a WMD measure of the document pair. A WMD measure may be a data object that describes, for each complete set of edges that together connect all of the first document words of a first document in a corresponding document pair and all of the second document words of a second document in a corresponding document pair, a sum of the similarity values of each pair of words weighed by their corresponding flow indicator in the complete set of edges.

Returning to FIG. 7, at step/operation 705, the labeling sub-engine 401 determines the cross-document similarity measure for the document pair based at least in part on each pairwise similarity measure for a word pair of the plurality of word pairs as well as each pairwise flow indicator for a word pair of the plurality of word pairs. In some embodiments, to determine the cross-document similarity measure for the document pair, the labeling sub-engine 401 applies the pairwise flow indicator for each word pair to the pairwise similarity measure for the word pair to determine a pairwise relationship measure for the word pair and combines the pairwise relationship measures of all word pairs in order to determine the cross-document similarity measure. In some embodiments, because non-affirmative pairwise flow indicators have a zero value, combining pairwise relationship measures determined by applying pairwise flow indicators to pairwise similarity measures has the effect of combining pairwise similarity measures of word pairs whose pairwise flow indicators indicates an affirmative pairwise flow value (e.g., pairwise similarity measures of word pairs with corresponding edges in a selected complete set of edges that maximizes the WMD measure for the document pair).

In some embodiments, determining the cross-document similarity measure sim(d,g) for a document d and a document g is performed in accordance with the steps/operations of the below equation:

$$S^*_{dg} = sim(d, g) = \max_{\{t_{[i,j]}\}} \sum_{\{i=1\}}^{\{m\}} \sum_{\{j=1\}}^{\{n\}} t_{[i,j]} s_{[i,j]} \quad \text{Equation 1}$$

$$\text{Subject to: } \sum_{\{j=1\}}^{\{n\}} t_{[i,j]} = f_i, \forall i. \quad [\text{Constraint C1}]$$

$$\sum_{\{i=1\}}^{\{m\}} t_{[i,j]} = f_j, \forall j \quad [\text{Constraint C2}]$$

$$t_{[i,j]} \geq 0, \forall i, j \quad [\text{Constraint C3}]$$

In Equation 1, i is an index variable that iterates over the m words of the document u, j is an index variable that iterates over the n words of the document l, $t_{i,j}$ is the pairwise flow indicator for a word the ith word of the document u and the jth word of the document f where the matrix $T=[t_{\{ij\}}]$ $1 \leq j \leq n$, $1 \leq i \leq m$, $s_{i,j}$ is the pairwise similarity measure for a word the ith word of the document u and the jth word of the document l, and $f_i$ is frequency word i defined as the ratio of TF-IDF of the word I and the sum of the TF-IDF of words appearing in the set of labeled documents 411. In a relaxed version of the problem, Equation 1 is modified and one of the constraints C1 or C2 is removed, however constraint C3 is maintained. An important property of S* as determined in accordance with Equation 1 is that its value is between (0, 1]. Moreover, in some embodiments, an optimal solution is defined as $T^* \in R^{m \times n}$ where $t_{ij}^* = f_i$ if $\text{argmax}_q(i, q)$, i=1, 2, ..., m and $t_{ij}^* = 0$ otherwise.

For example, in an exemplary embodiment of FIG. 12, given the unlabeled document 1211 and the labeled document 1212, the labeling sub-engine 401: (i) generates the set of pairwise similarity measures 1221 for the unlabeled document 1211 and the labeled document 1212, (ii) generates the set of frequency measures 1222 for the unlabeled document 1211 and the labeled document 1212, and (iii) generates the cross-document similarity measure of 0.9 for the unlabeled document 1211 and the labeled document 1212 using the Word Mover Similarity (WMS) calculation 1231.

Returning to FIG. 6, at step/operation 602, the labeling sub-engine 401 identifies a labeled training document of the labeled training documents 411 that has the highest cross-document similarity measure as the selected labeled training document for the particular unlabeled training document 412. For example, as depicted in the operational example of FIG. 8, the labeling sub-engine 401 selects the labeled training document 802 as the selected labeled training document for the unlabeled training document 801, because the cross-document similarity measure between the labeled training document 802 and the unlabeled training document 801 (i.e., the cross-document similarity measure of 0.82) is highest among the cross-document similarity measures depicted in FIG. 8.

While various embodiments of the present invention describe selecting a single selected labeled training document having the highest cross-document similarity measure, a person of ordinary skill in the relevant technology will recognize that any number of labeled training documents having the highest cross-document similarity measures may be selected according to different configuration parameters of the labeling sub-engine 401. Moreover, the number of selectable labeled training documents may be a trainable parameter of the labeling sub-engine 401.

At step/operation 603, the labeling sub-engine 401 determines the inferred semantic label for the particular unlabeled training document 412 based at least in part on the prior semantic label for the selected labeled training document that is associated with the particular unlabeled training document 412. In some embodiments, the labeling sub-engine 401 adopts the prior semantic label for the selected labeled training document that is associated with the particular unlabeled training document 412 as the inferred semantic label for the particular unlabeled training document 412. For example, the labeling sub-engine 401 may adopt an incident category of the selected labeled training document that is associated with the particular unlabeled training document 412 as the incident category and the incident subcategory of the particular unlabeled training document 412. As another example, the labeling sub-engine 401 may adopt a diagnosis code of the selected labeled training document that is associated with the particular unlabeled training document 412 as the diagnosis code of the particular unlabeled training document 412.

In some embodiments, the labeling sub-engine 401 adopts a portion of the prior semantic label for the selected labeled training document that is associated with the particular unlabeled training document 412 as the inferred semantic label for the particular unlabeled training document 412. For example, the labeling sub-engine 401 may adopt an incident category of the selected labeled training document that is associated with the particular unlabeled training document 412 as the incident category of the particular unlabeled training document 412. As another example, the labeling sub-engine 401 may adopt an incident subcategory of the selected labeled training document that is associated with the particular unlabeled training document 412 as the incident subcategory of the particular unlabeled training document 412. As a further example, the labeling sub-engine 401 may adopt the most relevant diagnosis code of the selected labeled training document that is associated with the particular unlabeled training document 412 as the diagnosis code of the particular unlabeled training document 412.

In some embodiments, the labeling sub-engine 401 performs one or more processing operations on the prior semantic label for the selected labeled training document that is associated with the particular unlabeled training document 412 to generate the inferred semantic label for the particular unlabeled training document 412. For example, the labeling sub-engine 401 may perform one or more processing operations on an incident category and an incident category of the selected labeled training document that is associated with the particular unlabeled training document 412 to generate the incident category and the incident subcategory of the particular unlabeled training document 412. As another example, the labeling sub-engine 401 may perform one or more processing operations on a diagnosis code of the selected labeled training document that is associated with the particular unlabeled training document 412 to generate the diagnosis code of the particular unlabeled training document 412.

Returning to FIG. 4, after generating the inferred semantic label for each unlabeled training document 412, the labeling sub-engine 401 generates training data 413 that includes one or more training data objects, where each training data object includes a corresponding unlabeled training document 412 and the inferred semantic label for the corresponding unlabeled training document 412. The labeling sub-engine 401 provides the training data 413 to a supervised model training sub-engine 402, which trains a supervised model in accordance with the training data 413.

While various embodiments of the present invention describe that the labeling sub-engine 401 generates training data 413 to the supervised model training sub-engine 402, which in turn trains a supervised model in accordance with the training data 413, a person of ordinary skill in the relevant technology will recognize that, in some embodiments, the labeling sub-engine 401 may directly generate a predicted label for each unlabeled document supplied to it based on predefined labels for labeled documents (e.g., keyphrases and short texts) by using unsupervised learning. In some embodiments, using the supervised model is configured to prevent supplying of underlying labeled data to third-party recipients for privacy reasons and/or for data integrity reasons.

In some embodiments, the supervised model training sub-engine 402 trains the trained supervised machine learning model to minimize a measure of error between each inferred semantic label for an unlabeled training document of the one or more unlabeled training documents and a corresponding untrained semantic label for the unlabeled training document. In some embodiments, the supervised model training sub-engine 402 trains the trained supervised machine learning model in accordance with an optimization-based training technique, such as based at least in part on gradient descent, gradient with backpropagation, and gradient descent with backpropagation through time.

In some embodiments, the trained supervised machine learning model is a recurrent neural network (RNN), such as a long-short term memory (LSTM) RNN. While various embodiments of the present invention have been described with reference to semantic-categorization-determining supervised machine learning models that are LSTMs, a person of ordinary skill in the relevant art will recognize that semantic-categorization-determining supervised machine learning models may have other architectures and semantic-categorization-determining unsupervised machine learning models may additionally or alternatively be utilized. Various aspects of supervised machine learning models configured to generate text categorizations, including exemplary expected input structures of such supervised machine learning models, are described in greater detail below with reference to FIG. 9.

FIG. 9 is a flowchart diagram of an example process 900 for generating a text categorization for an input document using a trained supervised machine learning model generated in accordance with the process 400 of FIG. 4. Using the various steps/operations of the process 900, the inference engine 122 of the NLP computing entity 106 can reliably and efficiently generate text categorizations for unlabeled documents.

The process 900 begins at step/operation 901 when the inference engine 122 determines an input vector representation of the input document. The input document may be any data object that describes an unlabeled text document, such as an unlabeled incident ticket or an unlabeled medical diagnosis document (e.g., an unlabeled provider note document). The vector representation of the input document may be any data object that describes one or more features of the text data associated with the input document. In some embodiments, the input vector-based representation includes a per-word representation for each input word of one or more input words in the input document.

For example, the input vector-based representation may include a fixed-length distributed word representation for each input word of one or more input words in the input document. An operational example of a fixed-length distributed word representation is a global vector (GloVe), such as the global vectors having the format and the architecture described in Pennington et al. GloVe: Global Vectors for Word Representation in Empirical Methods in Natural Language Processing (EMNLP) 1532-1543 (2014), which is incorporated herein by reference in its entirety.

At step/operation 902, the inference engine 122 processes the input vector representation using the trained supervised machine learning model generated in accordance with the process 400 of FIG. 4 in order to generate the text categorization for the input document. In some embodiments, the input document is an incident ticket document, and the text categorization comprises an incident category for the incident ticket document. In some embodiments, the input document is a medical diagnosis document, and the text categorization comprises a diagnosis category for the medical diagnosis document.

As noted above, the trained supervised machine learning model used to generate text categorizations of input documents may be an LSTM model. FIG. 10 provides an operational example of performing the step/operation 1002 using an LSTM. As depicted in FIG. 10, the depicted LSTM is configured to receive, at each operational time step, the per-word input vector representation 1001A-C for a word of the input document that corresponds to the operational time step in accordance to a sequential order of the words of the input document. The depicted LSTM is further configured to: (i) at a first operational time step, generate a hidden state 1002A based at least in part on processing the per-word input vector representation 1001A for the first operational time step in accordance with one or more trained parameters of the LSTM, and (ii) at each operational time step after the first operational time step, generate a hidden state 1002B-1002C based at least in part on processing, in accordance with the one or more trained parameters of the LSTM, a corresponding input per-word input vector representation 1001B-C for a word of the input document that corresponds to the operational time step and a hidden state 1002A-C generated by an immediately previous operational time step of the LSTM.

In some embodiments, the inference engine 122 is configured to generate the text categorization based at least in part on the hidden state generated by a final operational step of the LSTM. For example, the hidden state generated by a final operational step of the LSTM may be a vector that includes a per-categorization relationship probability value for each candidate text categorization of a plurality of candidate text categorizations. The inference engine 122 may normalize the per-categorization relationship probability values (e.g., using a softmax normalization operation) and select d candidate text categorizations having the highest normalized probability values as the text categorization for the input document (where d may be equal to one or more).

At step/operation 903, the inference engine 122 performs one or more categorization-based actions based at least in part on the text categorization. In some embodiments, performing the one or more categorization-based actions based at least in part on the text categorization includes displaying the one or more text categorizations using a text categorization recommendation user interface, such as the text categorization recommendation user interface 1100 of FIG. 11. As depicted in FIG. 11, the text categorization recommendation user interface 1100 displays a list of top recommended text categorizations for each sentence of a document, along with a probability score for each recommendation.

In some embodiments, performing the one or more categorization-based actions based at least in part on the text categorization includes generating a net promoter score (NPS) for the input document that describes an overall customer incident as expressed by the input document. In some embodiments, performing the one or more categorization-based actions based at least in part on the text categorization includes generating an NPS for a set of input documents, for example for all incident reports associated with an institution and/or for a recent subset of all incident reports associated with an institution.

In some embodiments, performing the one or more categorization-based actions includes performing one or more automated corrective measures and/or one or more automated load balancing operations (e.g., one or more hospital load balancing operations) based at least in part on cross-institution NPSs and/or based at least in part on per-incident-report NPSs. For example, if a cross-institution NPS shows consistent suboptimal service in a particular department, the inference engine 122 may allocate new staff members to the particular department. As another example, if a per-incident-report NPS indicates that a particular staff person associated with the incident report is suffering from network connectivity shortages, the inference engine 122 may allocate a new networking device and/or a new computing device to the staff person.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors, an input vector-based representation of an input document;
accessing, by the one or more processors, a supervised machine learning model that has been trained with automatically-generated training data comprising one or more inferred semantic labels that are generated for one or more unlabeled training documents, wherein:
the one or more inferred semantic labels are based at least in part on one or more prior semantic labels for one or more labeled training documents, and
the one or more labeled training documents are selected from a plurality of labeled training documents based at least in part on one or more cross-document similarity measures of at least a given value with respect to the one or more unlabeled training documents;
generating, by the one or more processors and using the supervised machine learning model, a categorization of the input document based at least in part on the input vector-based representation and the one or more inferred semantic labels; and
initiating, by the one or more processors, the performance of one or more categorization-based actions based at least in part on the categorization.

2. The computer-implemented method of claim 1, wherein the trained supervised machine learning model is generated by:
determining the one or more cross-document similarity measures for a plurality of document pairs that comprises the one or more unlabeled training documents and the one or more labeled training documents;
determining the one or more inferred semantic labels based at least in part on the one or more cross-document similarity measures for the plurality of document pairs;
generating, based at least in part on one or more vector-based representations for an unlabeled training document of the one or more unlabeled training documents, an untrained semantic label for the unlabeled training document; and
training the supervised machine learning model to minimize a measure of error between an inferred semantic label for the unlabeled training document and a corresponding untrained semantic label for the unlabeled training document.

3. The computer-implemented method of claim 2, wherein determining the one or more cross-document similarity measures for the plurality of document pairs comprises:
determining one or more unlabeled embedded representations for one or more unlabeled words of the unlabeled training document;
determining one or more labeled embedded representations for one or more labeled words of a labeled training document of the one or more labeled training documents;
determining, for a word pair of a plurality of word pairs that comprises a corresponding unlabeled word of the one or more unlabeled words and a corresponding labeled word of the one or more labeled words, a pairwise similarity measure of the one or more unlabeled embedded representations for the corresponding unlabeled word in the unlabeled training document and the one or more labeled embedded representations for the corresponding labeled word in the labeled training document;
determining, for a word pair of the plurality of word pairs, a pairwise flow indicator based at least in part on the pairwise similarity measure of the word pair relative to other pairwise similarity measures in a subset of the plurality of word pairs that is associated with the corresponding unlabeled word for the word pair; and
determining a cross-document similarity measure of the one or more cross-document similarity measures based at least in part on the pairwise similarity measure for the word pair of the plurality of word pairs as well as the pairwise flow indicator for the word pair of the plurality of word pairs.

4. The computer-implemented method of claim 3, wherein the pairwise similarity measure for the word pair is determined based at least in part on a cosine similarity of the one or more unlabeled embedded representations and the one or more labeled embedded representations.

5. The computer-implemented method of claim 3, wherein the pairwise flow indicator for the word pair is determined based at least in part on maximizing a word's mover distance measure of a document pair.

6. The computer-implemented method of claim 1, wherein the input vector-based representation comprises a fixed-length distributed word representation for one or more input words in the input document.

7. The computer-implemented method of claim 1, wherein the supervised machine learning model comprises a long-short term memory machine learning model.

8. The computer-implemented method of claim 1, wherein:
the input document comprises an incident ticket document, and
the categorization comprises an incident category for the incident ticket document.

9. The computer-implemented method of claim 1, wherein:
the input document comprises a medical diagnosis document, and
the categorization comprises a diagnosis category for the medical diagnosis document.

10. A computing system comprising memory and one or more processors communicatively coupled to the memory, the one or more processors configured to:
generate an input vector-based representation of an input document;
access a supervised machine learning model that has been trained with automatically-generated training data comprising one or more inferred semantic labels that are generated for one or more unlabeled training documents, wherein:
the one or more inferred semantic labels are based at least in part on one or more prior semantic labels for one or more labeled training documents, and
the one or more labeled training documents are selected from a plurality of labeled training documents based at least in part on one or more cross-document similarity measures of at least a given value with respect to the one or more unlabeled training documents;
generate, using the supervised machine learning model, a categorization of the input document based at least in part on the input vector-based representation and the one or more inferred semantic labels; and
initiate the performance of one or more categorization-based actions based at least in part on the categorization.

11. The computing system of claim 10, wherein the one or more processors are further configured to generate a supervised machine learning model by:
determining the one or more cross-document similarity measures for a plurality of document pairs that comprises the one or more unlabeled training documents and the one or more labeled training documents;
determining the one or more inferred semantic labels based at least in part on the one or more cross-document similarity measures for the plurality of document pairs;
generating, based at least in part on one or more vector-based representations for an unlabeled training document of the one or more unlabeled training documents, an untrained semantic label for the unlabeled training document; and
training the supervised machine learning model to minimize a measure of error between an inferred semantic label for the unlabeled training document of and a corresponding untrained semantic label for the unlabeled training document.

12. The computing system of claim 11, wherein the one or more processors are further configured to determine the one or more cross-document similarity measures for the plurality of document pairs by:
determining one or more unlabeled embedded representations for one or more unlabeled words of the unlabeled training document;
determining one or more labeled embedded representations for one or more labeled words of a labeled training document of the one or more labeled training documents;
determining, for a word pair of a plurality of word pairs that comprises a corresponding unlabeled word of the one or more unlabeled words and a corresponding labeled word of the one or more labeled words, a pairwise similarity measure of the one or more unlabeled embedded representations for the corresponding unlabeled word in the unlabeled training document and the one or more labeled embedded representations for the corresponding labeled word in the labeled training document;
determining, for a word pair of the plurality of word pairs, a pairwise flow indicator based at least in part on the pairwise similarity measure of the word pair relative to other pairwise similarity measures in a subset of the plurality of word pairs that is associated with the corresponding unlabeled word for the word pair; and determining a cross-document similarity measure of the one or more cross-document similarity measures based at least in part on the pairwise similarity measure for the word pair of the plurality of word pairs as well as the pairwise flow indicator for the word pair of the plurality of word pairs.

13. The computing system of claim 10, wherein:
the input document comprises an incident ticket document, and
the categorization comprises an incident category for the incident ticket document.

14. The computing system of claim 10, wherein:
the input document comprises a medical diagnosis document, and
the categorization comprises a diagnosis category for the medical diagnosis document.

15. One or more non-transitory computer-readable storage media including instructions that, when executed by one or more processors, cause the one or more processors to:
generate an input vector-based representation of an input document;
access a supervised machine learning model that has been trained with automatically-generated training data comprising one or more inferred semantic labels that are generated for one or more unlabeled training documents, wherein:
the one or more inferred semantic labels are based at least in part on one or more prior semantic labels for one or more labeled training documents, and
the one or more labeled training documents are selected from a plurality of labeled training documents based at least in part on one or more cross-document similarity measures of at least a given value with respect to the one or more unlabeled training documents;
generate, using the supervised machine learning model, a categorization of the input document based at least in part on the input vector-based representation and the one or more inferred semantic labels; and
initiate the performance of one or more categorization-based actions based at least in part on the categorization.

16. The one or more non-transitory computer-readable storage media of claim 15, further including instructions that, when executed by the one or more processors, cause the one or more processors to generate the supervised machine learning model by:
determining the one or more cross-document similarity measures for a plurality of document pairs that comprises the one or more unlabeled training documents and the one or more labeled training documents;
determining the one or more inferred semantic labels based at least in part on the one or more cross-document similarity measures for the plurality of document pairs;
generating, based at least in part on one or more vector-based representations for an unlabeled training document of the one or more unlabeled training documents, an untrained semantic label for the unlabeled training document; and
training the supervised machine learning model to minimize a measure of error between an inferred semantic label for the unlabeled training document-of and a corresponding untrained semantic label for the unlabeled training document.

17. The one or more non-transitory computer-readable storage media of claim 16, further including instructions that, when executed by the one or more processors, cause the one or more processors to determine the one or more cross-document similarity measures for the plurality of document pairs by:
determining one or more unlabeled embedded representations for one or more unlabeled words of the unlabeled training document;
determining one or more labeled embedded representations for one or more labeled words of a labeled training document of the one or more labeled training documents;
determining, for a word pair of a plurality of word pairs that comprises a corresponding unlabeled word of the one or more unlabeled words and a corresponding labeled word of the one or more labeled words, a pairwise similarity measure of the one or more unlabeled embedded representations for the corresponding unlabeled word in the unlabeled training document and the one or more labeled embedded representations for the corresponding labeled word in the labeled training document;
determining, for a word pair of the plurality of word pairs, a pairwise flow indicator based at least in part on the pairwise similarity measure of the word pair relative to other pairwise similarity measures in a subset of the plurality of word pairs that is associated with the corresponding unlabeled word for the word pair; and
determining a cross-document similarity measure of the one or more cross-document similarity measures based at least in part on the pairwise similarity measure for the word pair of the plurality of word pairs as well as the pairwise flow indicator for the word pair of the plurality of word pairs.

18. The one or more non-transitory computer-readable storage media of claim 17, further including instructions that, when executed by the one or more processors, cause the one or more processors to determine the pairwise similarity measure for the word pair based at least in part on a cosine similarity of the corresponding unlabeled word and the corresponding labeled word.

19. The one or more non-transitory computer-readable storage media of claim 15, wherein;
the input document comprises an incident ticket document, and
the categorization comprises an incident category for the incident ticket document.

20. The one or more non-transitory computer-readable storage media of claim 15, wherein:
the input document comprises a medical diagnosis document, and
the categorization comprises a diagnosis category for the medical diagnosis document.

* * * * *

UNITED STATES PATENT AND TRADEMARK OFFICE
CERTIFICATE OF CORRECTION

PATENT NO. : 12,106,051 B2
APPLICATION NO. : 16/930862
DATED : October 1, 2024
INVENTOR(S) : Suman Roy et al.

Page 1 of 1

It is certified that error appears in the above-identified patent and that said Letters Patent is hereby corrected as shown below:

In the Claims

In Column 20, Line 51, Claim 2, delete "trained supervised" and insert -- supervised --, therefor.

In Column 22, Line 42, Claim 11, delete "document of" and insert -- document --, therefor.

In Column 24, Line 6, Claim 16, delete "document-of" and insert -- document --, therefor.

Signed and Sealed this
Seventeenth Day of December, 2024

Derrick Brent
*Acting Director of the United States Patent and Trademark Office*